US008501024B2

(12) United States Patent
Zettl

(10) Patent No.: US 8,501,024 B2
(45) Date of Patent: Aug. 6, 2013

(54) METHOD OF MANUFACTURE OF ATOMICALLY THIN BORON NITRIDE

(75) Inventor: Alexander K. Zettl, Kensington, CA (US)

(73) Assignee: The Regents of the University of California, Oakland, CA (US)

(*) Notice: Subject to any disclaimer, the term of this patent is extended or adjusted under 35 U.S.C. 154(b) by 342 days.

(21) Appl. No.: 12/895,624

(22) Filed: Sep. 30, 2010

(65) Prior Publication Data

US 2011/0073562 A1 Mar. 31, 2011

Related U.S. Application Data

(60) Provisional application No. 61/247,530, filed on Sep. 30, 2009.

(51) Int. Cl.
*B44C 1/22* (2006.01)
(52) U.S. Cl.
USPC ............... 216/67; 216/74; 216/81; 977/734; 977/840; 977/880; 977/881
(58) Field of Classification Search
None
See application file for complete search history.

(56) References Cited

U.S. PATENT DOCUMENTS 4,671,850 A * 6/1987 Shimkunas .................... 216/41

OTHER PUBLICATIONS

J.C. Meyer, et al., "Selective Sputtering and Atomic Resolution Imaging of Atmoically Thin Boron Nitride Membrane", Nano Letters, vol. 9 (2009) pp. 2683-2689.*

D. Pacile, et al., "The Two Dimensional Phase of Bron Nitride: Few Atmoic Layer Sheets and Suspended Membranes", Applied Physics Letters vol. 92 (2008) pp. 133107-1 to 133107-3.*
Watanabe et al., "Direct-bandgap properties and evidence for ultraviolet lasing of hexagonal boron nitride single crystal," Nature Materials. vol. 3, pp. 404-409, (2004).
Taniguchi et al., "Defect characterization of cBN single crystals grown under HP/HT," physica status solidi (a), vol. 201, No. 11, pp. 2573-2577, (2004).
Gubanov et al., "Electronic structure of defects and impurities in III-V nitrides: Vacancies in cubic boron nitride," Physical Review B, vol. 53, No. 8, pp. 4377-4385, (Feb. 15, 1996).
Rubio et al., "Theory of graphitic boron nitride nanotubes," Physical Review B, vol. 49, No. 7, pp. 5081-5084, (Feb. 15, 1994).
Chopra et al., "Boron Nitride Nanotubes," Science, vol. 269, No. 5226, pp. 966-967 (Aug. 18, 1995).
Novoselov et al., "Two-dimensional gas of massless Dirac fermions in graphene," Nature, vol. 438, pp. 197-200 (Nov. 10, 2005).

(Continued)

*Primary Examiner* — Lan Vinh
*Assistant Examiner* — Jiong-Ping Lu
(74) *Attorney, Agent, or Firm* — Lawrence Berkeley National Laboratory

(57) ABSTRACT

The present invention provides a method of fabricating at least one single layer hexagonal boron nitride (h-BN). In an exemplary embodiment, the method includes (1) suspending at least one multilayer boron nitride across a gap of a support structure and (2) performing a reactive ion etch upon the multilayer boron nitride to produce the single layer hexagonal boron nitride suspended across the gap of the support structure. The present invention also provides a method of fabricating single layer hexagonal boron nitride. In an exemplary embodiment, the method includes (1) providing multilayer boron nitride suspended across a gap of a support structure and (2) performing a reactive ion etch upon the multilayer boron nitride to produce the single layer hexagonal boron nitride suspended across the gap of the support structure.

14 Claims, 19 Drawing Sheets

OTHER PUBLICATIONS

Novoselov et al., "Electric Field Effect in Atomically Thin Carbon Films," Science, vol. 306, No. 5696, pp. 666-669 (Oct. 22, 2004).

Novoselov et al., "Two-dimensional atomic crystals," Proceedings of the National Academy of Sciences, vol. 102 No. 30 pp. 10451-10453, (Jul. 26, 2005).

Meyer et al., "On the roughness of single- and bi-layer graphene membranes," Solid State Communications, vol. 143, pp. 101-109, (2007).

Meyer et al., "The structure of suspended graphene sheets," Nature vol. 446, pp. 60-63, (Mar. 1, 2007).

Pacilé et al., "The two-dimensional phase of boron nitride: Few-atomic-layer sheets and suspended membranes," Applied Physics Letters, vol. 92, pp. 133107-1-133107-3, (2008).

Jin et al., "Fabrication of a Freestanding Boron Nitride Single Layer and Its Defect Assignments," Physical Review Letters, vol. 102, pp. 195505-1-195505-4, (May 15, 2009).

Meyer et al., "Selective Sputtering and Atomic Resolution Imaging of Atomically Thin Boron Nitride Membranes," Nano Letters, vol. 9, No. 7, pp. 2683-2689, (2009).

Kisielowski et al., "Detection of Single Atoms and Buried Defects in Three Dimensions by Aberration-Corrected Electron Microscopes with 0.5-Å Information Limit," Microscopy and Microanalysis, vol. 14, pp. 469-477, (2008).

Meyer et al., "Direct Imaging of Lattice Atoms and Topological Defects in Graphene Membranes," Nano Letters, vol. 8, No. 11, pp. 3582-3586, (2008).

Müller et al., "Aberration-corrected optics: from an idea to a device," Physics Procedia 1, pp. 167-178, (2006).

Lentzen et al., "Contrast Transfer and Resolution Limits for Sub-Angstrom High-Resolution Transmission Electron Microscopy," Microscopy amd Microanalysis, vol. 14, pp. 16-26, (2008).

Demczyk et al., "Structure of boron nitride nanotubules," Applied Physics Letters, vol. 78, pp. 2772-2774, (2001).

Zobelli et al., "Shaping single walled nanotubes with an electron beam," Physical Review B, vol. 77, pp. 045410-1-045410-8, (2008).

Girit et al., "Graphene at the Edge: Stability and Dynamics," Science, vol. 323, No. 5922, pp. 1705-1708, (Mar. 27, 2009).

Egerton et al., "Beam-Induced Damage to Thin Specimens in an Intense Electron Probe," Microscopy and Microanalysis, vol. 12, pp. 65-71, (2006).

Smith et al., "Electron irradiation effects in single wall carbon nanotubes," Journal of Applied Physics, vol. 90, pp. 3509-3515 (2001).

Crespi et al., "Anisotropic electron-beam damage and the collapse of carbon nanotubes," Physical Review B, vol. 54, pp. 5927-5931, (1996).

Blasé et al., "Frustration Effects and Microscopic Growth Mechanisms for BN Nanotubes," Physical Review Letters, vol. 80, pp. 1666-1669, (1998).

Loiseau et al., "Boron Nitride Nanotubes with Reduced Numbers of Layers Synthesized by Arc Discharge," Physical Review Letters, vol. 76, pp. 4737-4740, (1996).

Azevedo et al., "Electronic structure of defects in a boron nitride monolayer," The European Physical Journal B, vol. 67, No. 4, pp. 507-512, (Feb. 11, 2009).

Liu et al., "Ab initio studies of possible magnetism in a BN sheet by nonmagnetic impurities and vacancies," Physical Review B, vol. 76, pp. 014405-1-014405-8, (2007).

* cited by examiner

METHOD OF MANUFACTURE OF ATOMICALLY THIN BORON NITRIDE

RELATED APPLICATIONS

The application claims priority to U.S. Provisional Patent Application Ser. No. 61/247,530, filed Sep. 30, 2009, which is herein incorporated by reference in its entirety.

STATEMENT OF GOVERNMENT SUPPORT

This invention was made with government support under Contract No. DE-AC02-05CH 11231 awarded by the U.S. Department of Energy. The government has certain rights in this invention.

BACKGROUND OF THE INVENTION

The present invention relates to the field of material science and, more particularly, to a method of fabricating at least one single layer hexagonal boron nitride (h-BN).

Boron Nitride

Boron nitride (BN) is a synthetic material fashionable in both hexagonal and cubic structures (See K. Watanabe, T. Taniguchi, and H. Kanda, Nature Mater. 3, 404 (2004), T. Taniguchi, K. Watanabe, and S. Koizumi, Physics Status Solidi A. 201, 2573 (2004), V. A. Gubanov, Z. W. Lu, B. M. Klein, and C. Y., Physical Review B 53, 4377 (1996.). Hexagonal BN (h-BN) consists of $sp^2$-bonded two-dimensional (2D) layers comprising alternate boron and nitrogen atoms in a honeycomb arrangement; these layers are stacked and van-der-Waals bonded to form a highly anisotropic three-dimensional (3D) crystal. The overall structure and atomic spacings of h-BN are very similar to carbon-based graphite (See A. Rubio, J. L. Corkill, and M. L. Cohen, Physical Review B 49, 5081 (1994), N. G. Chopra, R. J. Luyken, K. Cherrey, V. H. Crespi, M. L. Cohen, S. G. Louie, and A. Zettl. Science 269, 966 (1995).).

In h-BN, however, the boron and nitrogen atoms are alternately stacked directly on top of each other on the adjacent atomic layers resulting in AAA stacking, as shown in FIG. 1, while graphite maintains an offset Bernal structure (ABA). Boron nitride maintains an AAA stacking where boron and nitrogen atoms are alternately stacked on top of each other. In addition, the slightly ionic bonding (both in-plane and out-of-plane) in h-BN further sets this material apart from graphite. h-BN is electrically insulating with a large band gap both within and across the layers, while graphite is a semi-metal with high levels of conductivity within the layers (See K. Watanabe, T. Taniguchi, and H. Kanda, Nature Mater. 3, 404 (2004), K. S. Novoselov, A. K. Geim, S. V. Morozov, D. Jiang, M. I. Katsnelson, I. V. Grigorieva, S. V. Dubonos and A. A. Firsov, Nature 438, 197 (2005), K. S. Novoselov, A. K. Geim, S. V. Morozov, D. Jiang, Y. Zhang, S. V. Dubonos, I. V. Grigorieva, and A. A. Firsov, Science 306, 666 (2004).).

Graphene

Graphene is a single layer of carbon atoms bonded together forming a honeycomb structure. The recent successful isolation and atomic scale investigation of single layer graphite (i.e., grapheme (See K. S. Novoselov, A. K. Geim, S. V. Morozov, D. Jiang, Y. Zhang, S. V. Dubonos, I. V. Grigorieva, and A. A. Firsov, Science 306, 666 (2004), K. S. Novoselov, D. Jiang, F. Schedin, T. J. Booth, V. V. Khotkevich, S. V. Morozov, and A. K. Geim, PNAS 102, 10451 (2005), J. C. Meyer, A. K. Geim, M. I. Katsnelson, K. S. Novoselov, D. Obergfell, S. Roth, C. Girit, and A. Zettl, Solid State Communications 143, 101 (2007), J. C. Meyer, A. K. Geim, M. I. Katsnelson, K. S. Novoselov, T. J. Booth, and S. Roth, Nature 446, 60 (2007).)) has stimulated interest in atomically thin sheets of other layered materials, including BN (See K. S. Novoselov, D. Jiang, F. Schedin, T. J. Booth, V. V. Khotkevich, S. V. Morozov, and A. K. Geim, PNAS 102, 10451 (2005), D. Facile, J. C. Meyer, Ç . Ö. Girit, and A. Zettl, Appl. Phys. Let. 92, 133107 (2008).). Single layer h-BN is considered the thinnest possible 2D crystal with slightly ionic bonds. This characteristic makes atomically thin h-BN an ideal model system in which to study atomic configurations, including defects, edges, and vacancies of 2D ionic crystals. Of particular interest is the possibility of using an atomic resolution probe to unambiguously identify the atomic species, i.e., to distinguish boron from nitrogen in any particular layer of h-BN.

Mechanical Exfoliation

The same mechanical exfoliation methods used to isolate graphene from graphite can also be applied to h-BN (See K. S. Novoselov, D. Jiang, F. Schedin, T. J. Booth, V. V. Khotkevich, S. V. Morozov, and A. K. Geim, PNAS 102, 10451 (2005), D. Pacilé, J. C. Meyer, Ç . Ö. Girit, and A. Zettl, Appl. Phys. Let. 92, 133107 (2008).). However, due to the stronger interplane bonding in h-BN, mononlayer sheets of h-BN are difficult to isolate, and at best few-atomic-layer specimens are obtained (See D. Pacilé, J. C. Meyer, Ç . Ö. Girit, and A. Zettl, Appl. Phys. Let. 92, 133107 (2008).).

Characterizing Atomic Structure, Defects, and Edges in Thin Free-Standing Membranes An ideal tool with which to characterize atomic structure, defects, and edges in thin free-standing membranes is a high resolution TEM. Conventional TEMs, however, do not have the required resolution for distinguishing atoms in h-BN and are often operated at very high voltages leading to immediate sample damage before any reliable observations can be made.

Distinguishing Boron from Nitrogen

Boron and nitrogen have similar atomic numbers and core electron configurations, hence similar scattering power for TEM imaging electrons. The resulting intensity profiles for individual B and N atoms in the reconstructed phase image for a monolayer region are thus expected to be similar, but not identical. To distinguish B from N requires the necessary resolution and sensitivity (signal-to-noise).

TEM Instrumentation Errors

Potential TEM instrumentation errors can easily lead to erroneous image intensity results and the misidentification of the atomic sublattices in thin h-BN specimens. One error is sample tilt, where the TEM imaging electron beam is not perfectly normal to the sample layers. Another is coma astigmatism associated with the TEM electron optics.

Imaging and Atomic Structure of Boron Nitride

C. Jin, F. Lin, K. Suenaga, and S. Iijima. Phys. Rev. Lett. 102, 195505 (2009) and J. C. Meyer, A. Chuvilin, G. Algara-Siller, J. Biskupek, and U. Kaiser, Nano Lett., DOI: 10.1021/N19011497, (2009) studied the imaging and atomic structure of boron nitride. In both studies, suspended atomically-thin layers of h-BN were produced using e-beam irradiation within the TEM itself rather than independently ex-situ. An atomically resolved lattice and triangular defects were observed in both studies.

Meyer et al. were unable to distinguish B from N. Jin et al. used intensity profiles in phase contrast images to distinguish B from N. However, their adjacent atom (column) asymmetry for an identified n=2 bilayer exceeds their asymmetry plotted for an identified n=1 monolayer.

Therefore, a method of fabricating at least one single layer hexagonal boron nitride (h-BN) is needed.

SUMMARY OF THE INVENTION

The present invention provides a method of fabricating at least one single layer hexagonal boron nitride (h-BN). In an exemplary embodiment, the method includes (1) suspending at least one multilayer boron nitride across a gap of a support structure and (2) performing a reactive ion etch upon the multilayer boron nitride to produce the single layer hexagonal boron nitride suspended across the gap of the support structure. The present invention also provides a method of fabricating single layer hexagonal boron nitride. In an exemplary embodiment, the method includes (1) providing multilayer boron nitride suspended across a gap of a support structure and (2) performing a reactive ion etch upon the multilayer boron nitride to produce the single layer hexagonal boron nitride suspended across the gap of the support structure.

In an exemplary embodiment, the suspending includes (a) peeling boron nitride (BN) powder, (b) moving the peeled BN powder to a wafer, (c) identifying at least one BN flake, and (d) transferring the BN flake to the support structure. In an exemplary embodiment, the moving includes moving the peeled BN powder to a silicon wafer. In an exemplary embodiment, the identifying includes using at least one optical microscope to identify the BN flake.

In an exemplary embodiment, the transferring includes (i) placing the support structure on top of the BN flake, (ii) depositing alcohol on the support structure and the BN flake, (iii) allowing the alcohol to dry, (iv) putting polyimide on the support structure and BN flake, (v) heating the support structure, the BN flake, and polyimide, (vi) peeling the polyimide from the support structure and the BN flake, resulting in the BN flake adhered to the grid, (vii) immersing the BN flake adhered to the support structure in a methylpyrrolidone bath, thereby dissolving the polyimide, (viii) relocating the BN flake adhered to the support to an isopropanol solution, and (ix) letting the BN flake adhered to the support structure dry. In an exemplary embodiment, the placing includes placing a transmission electron microscope (TEM) grid on top of the BN flake. In an exemplary embodiment, the depositing includes depositing isopropanol alcohol on the support structure and the BN flake. In an exemplary embodiment, the heating includes heating the support structure, the BN flake, and the polyimide at 110° C. for 10 minutes. In an exemplary embodiment, the immersing includes immersing the BN flake adhered to the support structure in a methylpyrrolidone bath at 60° C.

In an exemplary embodiment, the performing includes employing a mixture of oxygen and nitrogen plasmas. In an exemplary embodiment, the employing includes a step 285 of employing the mixture with energy in a range of 22 to 30 watts.

BRIEF DESCRIPTION OF THE DRAWINGS

The present invention is described with respect to particular exemplary embodiments thereof and reference is accordingly made to the drawings in which:

FIG. 3a is a high resolution TEM (HREM) image of a suspended thin h-BN specimen produced by the present invention.

FIG. 3b is a color gradient BN reconstructed phase image of FIG. 3a.

FIG. 3c is a thickness map of the BN produced by the present invention.

FIG. 4a depicts resulting images from the summation of twenty unit cells in a one to four layer BN produced by the present invention.

FIG. 4b depicts intensity line profile from the unit cell images in FIG. 4a.

FIG. 4c depicts a model for the edge-on structure of BN lattice with its mean atomic projected potential (shown on top of the lattice).

FIG. 4d depicts simulated intensity modulations in an exit wave phase image for a single to four layer area in BN.

FIG. 5a depicts a reconstructed phase image of BN with a triangular mono-vacancy and a large vacancy pointed by arrows.

FIG. 5b depicts a model indicating the position of boron and nitrogen atoms in the monolayer BN.

FIG. 5c depicts a model showing the boron and nitrogen atom positions in a large vacancy shown in FIG. 5a.

DETAILED DESCRIPTION OF THE INVENTION

The present invention provides a method of fabricating at least one single layer hexagonal boron nitride (h-BN). In an exemplary embodiment, the method includes (1) suspending at least one multilayer boron nitride across a gap of a support structure and (2) performing a reactive ion etch upon the multilayer boron nitride to produce the single layer hexagonal boron nitride suspended across the gap of the support structure. The present invention also provides a method of fabricating single layer hexagonal boron nitride. In an exemplary embodiment, the method includes (1) providing multilayer boron nitride suspended across a gap of a support structure and (2) performing a reactive ion etch upon the multilayer boron nitride to produce the single layer hexagonal boron nitride suspended across the gap of the support structure.

The present invention provides for the isolation of suspended, single-layer h-BN by using a combination of mechanical exfoliation and reactive ion etching. The present invention provides an exfoliation and reactive ion etching process that allows suspended, monolayer and higher-number-layer sheets of h-BN to be produced, often with a highly desirable stepwise progression from one layer to higher order layers in a single suspended specimen. The present invention provides for the isolation of free-standing monolayer membranes of h-BN. The present invention provides an exfoliation/reactive ion etching method.

An ultra-high resolution transmission electron microscope (TEM) can be used to resolve individual atoms in the lattice, and, furthermore, the boron and nitrogen atoms can be identified using TEM intensity profiles. Higher-layer-number regions of the suspended sample can also be investigated, along with defect structure and edge configurations. By contrasting atomic intensity profiles for even- and odd-number layers, every atom in the three dimensional multilayer crystal can be identified. The present invention has made possible sequential-monolayer ultra-high-resolution TEM studies of h-BN.

Figure 2A:
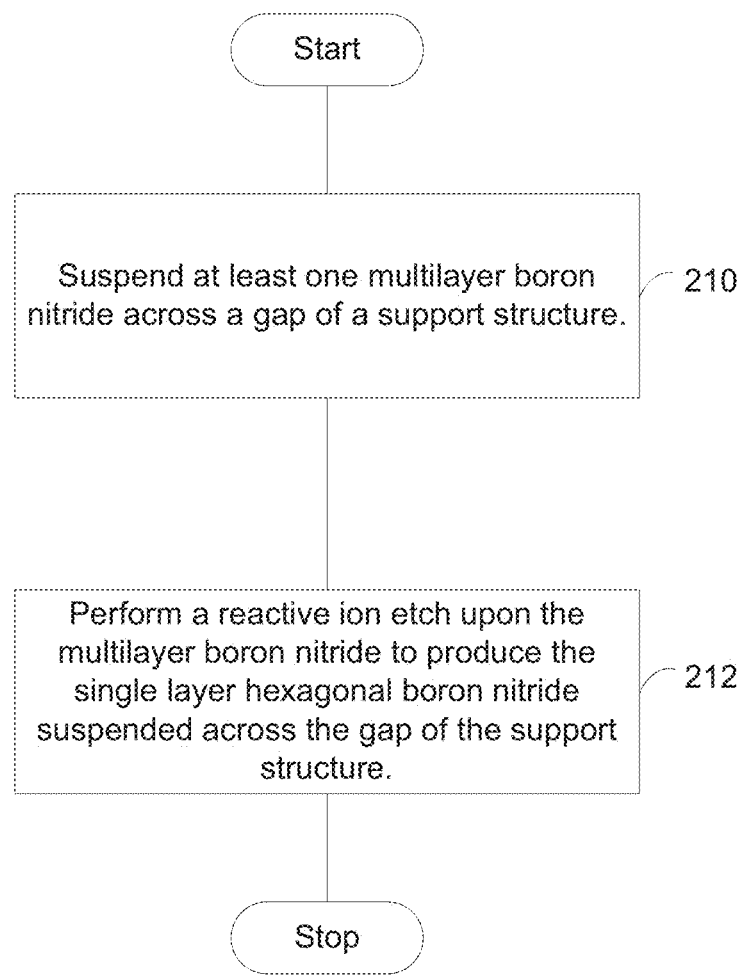
FIG. 2A is a flowchart in accordance with an exemplary embodiment of the present invention.

Referring to FIG. 2A, in an exemplary embodiment, the present invention includes a step 210 of suspending at least one multilayer boron nitride across a gap of a support structure and a step 212 of performing a reactive ion etch upon the multilayer boron nitride to produce the single layer hexagonal boron nitride suspended across the gap of the support structure.

Figure 2B:
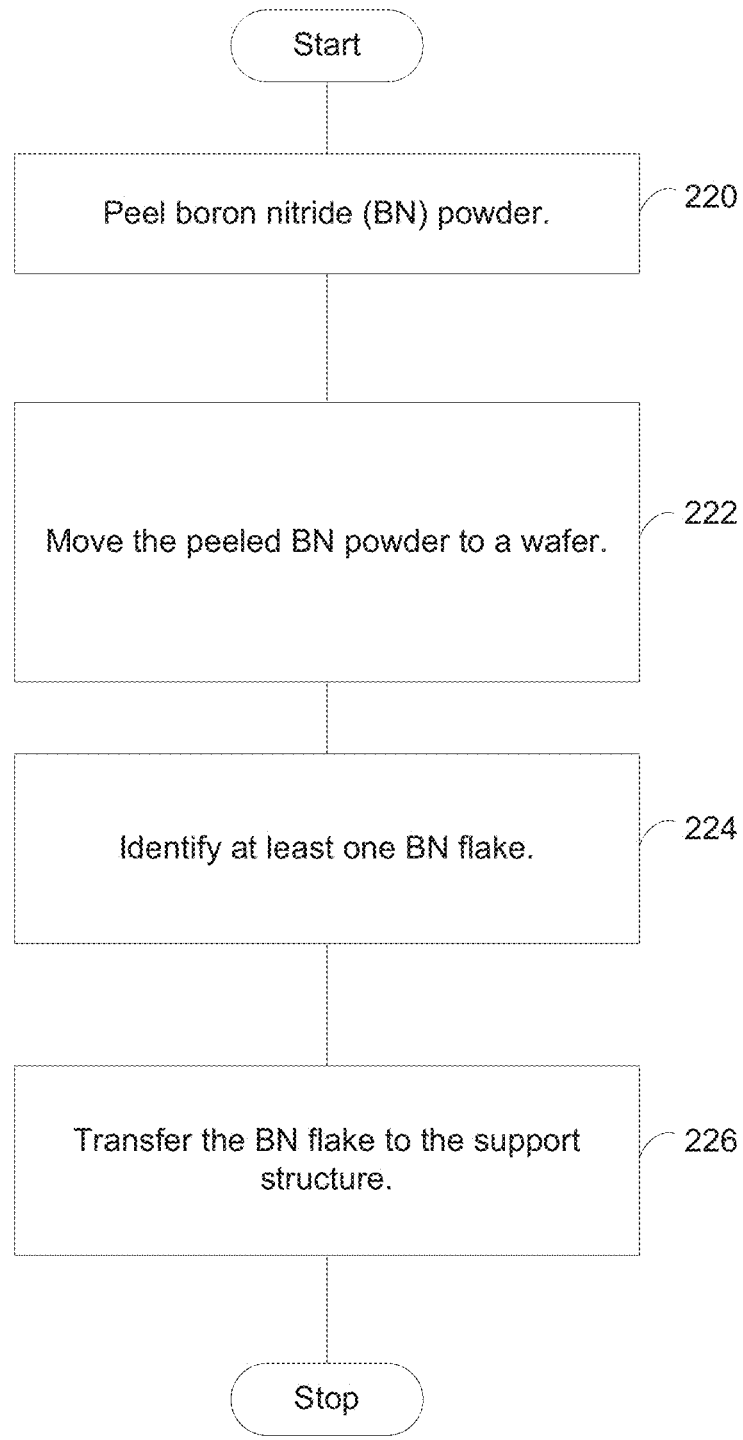
FIG. 2B is a flowchart in accordance with an exemplary embodiment of the present invention.
Figure 2C:
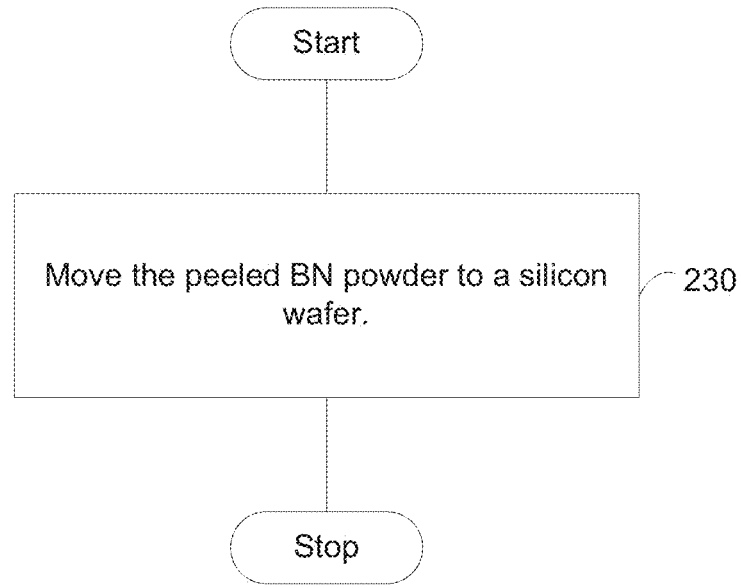
FIG. 2C is a flowchart in accordance with an exemplary embodiment of the present invention.
Figure 2D:
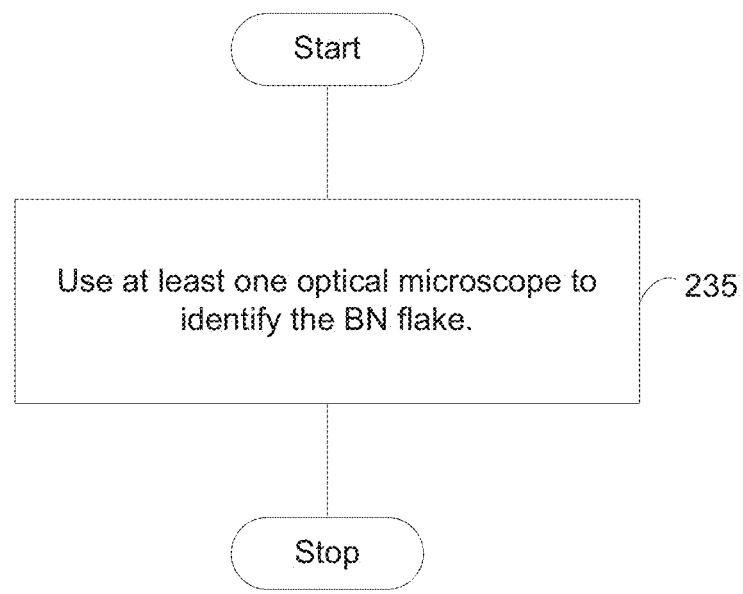
FIG. 2D is a flowchart in accordance with an exemplary embodiment of the present invention.

Referring to FIG. 2B, in an exemplary embodiment, suspending step 210 includes a step 220 of peeling boron nitride (BN) powder, a step 222 of moving the peeled BN powder to a wafer, a step 224 of identifying at least one BN flake, and a step 226 of transferring the BN flake to the support structure. Referring to FIG. 2C, in an exemplary embodiment, moving step 222 includes a step 230 of moving the peeled BN powder to a silicon wafer. Referring to FIG. 2D, in an exemplary embodiment, identifying step 224 includes a step 235 of using at least one optical microscope to identify the BN flake.

Figure 2E:
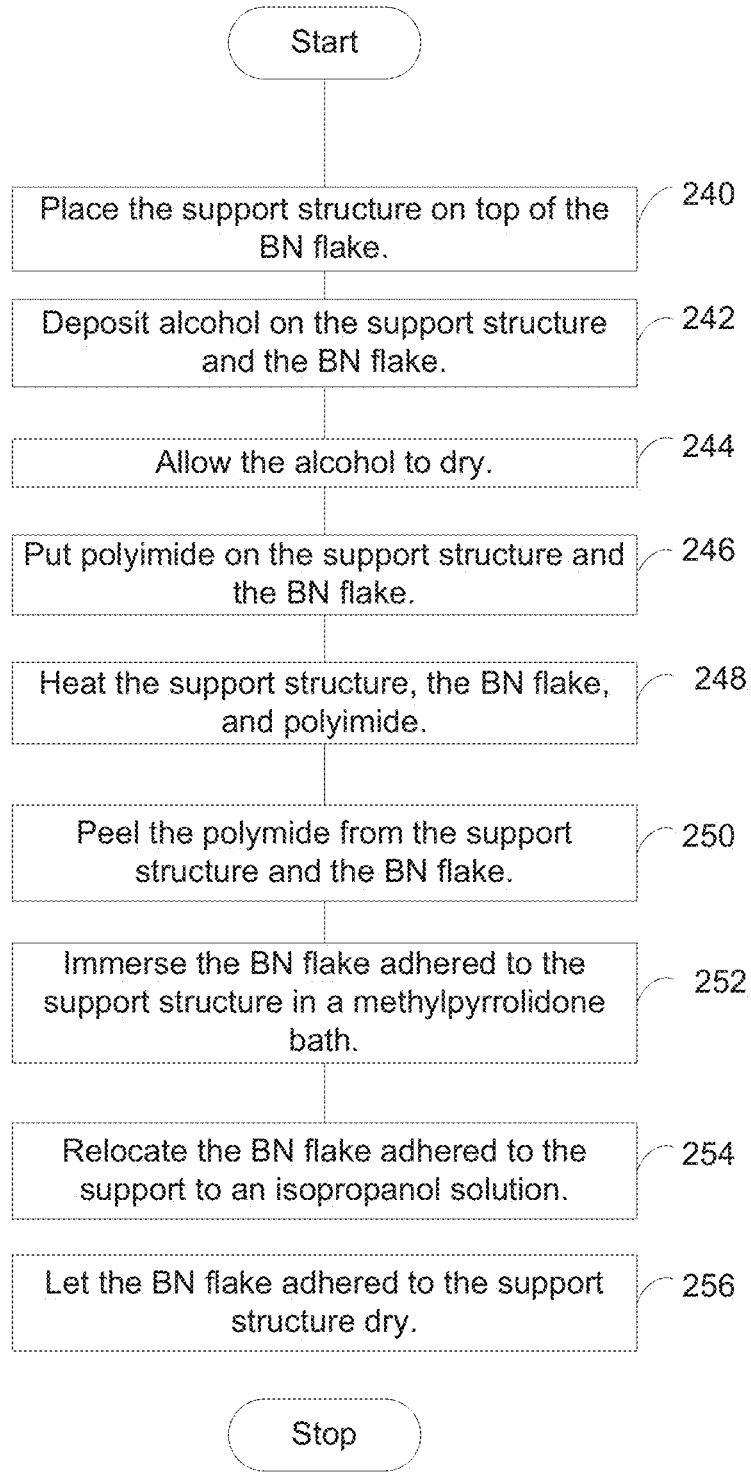
FIG. 2E is a flowchart in accordance with an exemplary embodiment of the present invention.
Figure 2F:
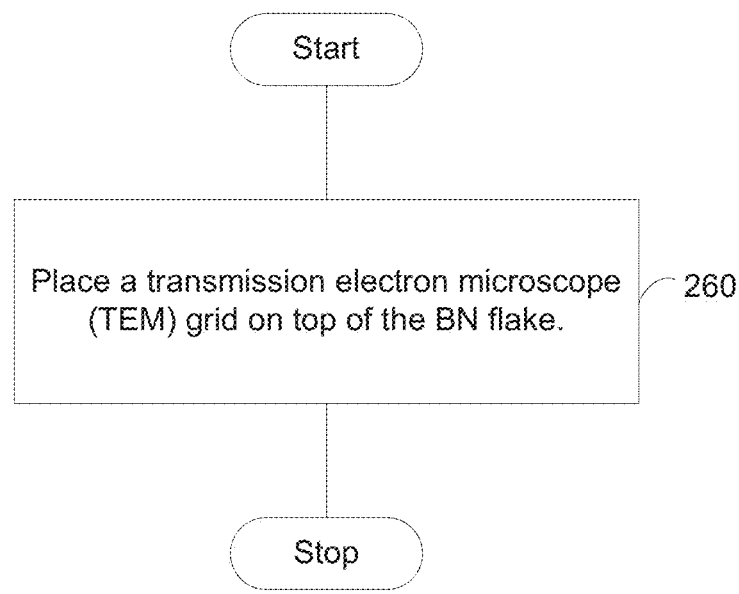
FIG. 2F is a flowchart in accordance with an exemplary embodiment of the present invention.
Figure 2G:
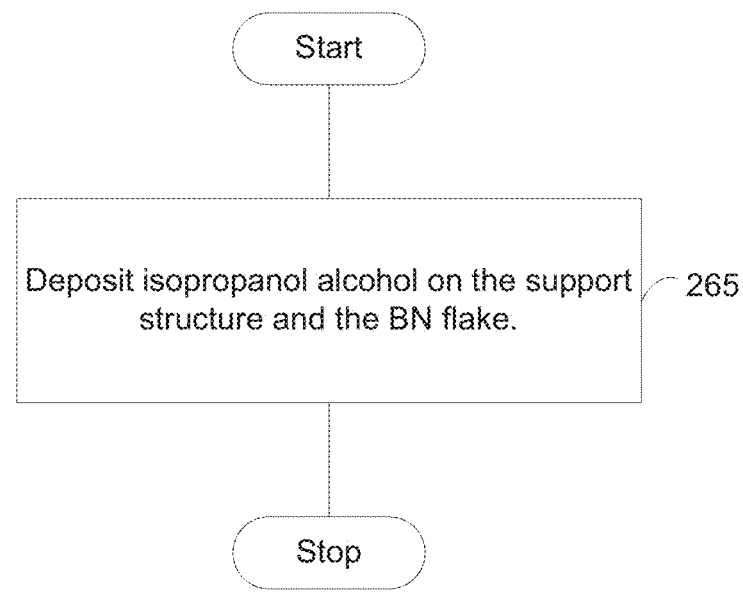
FIG. 2G is a flowchart in accordance with an exemplary embodiment of the present invention.
Figure 2H:
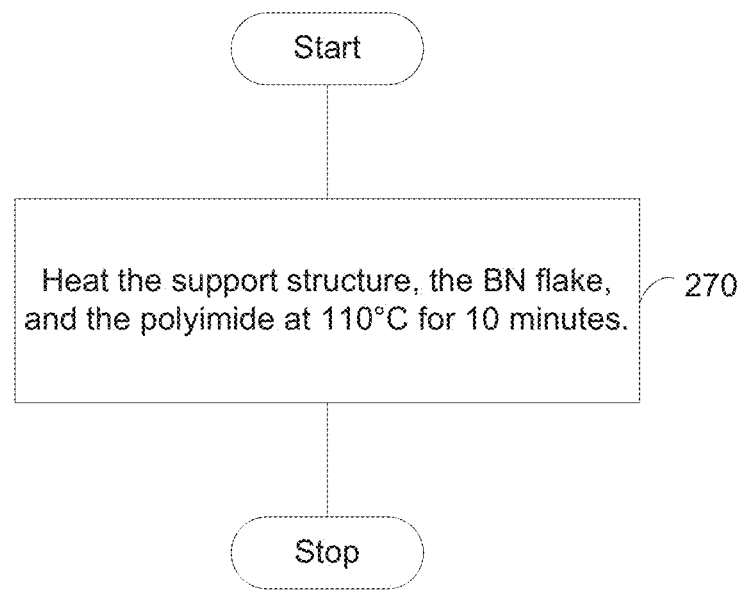
FIG. 2H is a flowchart in accordance with an exemplary embodiment of the present invention.
Figure 2I:
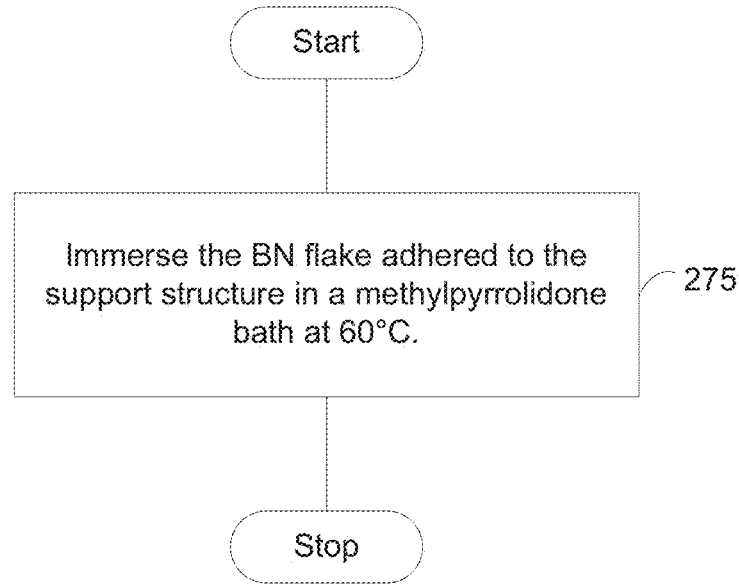
FIG. 2I is a flowchart in accordance with an exemplary embodiment of the present invention.

Referring to FIG. 2E, in an exemplary embodiment, transferring step 226 includes a step 240 of placing the support structure on top of the BN flake, a step 242 of depositing alcohol on the support structure and the BN flake, a step 244 of allowing the alcohol to dry, a step 246 of putting polyimide on the support structure and BN flake, a step 248 of heating the support structure, the BN flake, and polyimide, a step 250 of peeling the polyimide from the support structure and the BN flake, resulting in the BN flake adhered to the grid, a step 252 of immersing the BN flake adhered to the support structure in a methylpyrrolidone bath, thereby dissolving the polyimide, a step 254 of relocating the BN flake adhered to the support to an isopropanol solution, and a step 256 of letting the BN flake adhered to the support structure dry. Referring to FIG. 2F, in an exemplary embodiment, placing step 242 includes a step 260 of placing a transmission electron microscope (TEM) grid on top of the BN flake. Referring to FIG. 2G, in an exemplary embodiment, depositing step 242 includes a step 265 of depositing isopropanol alcohol on the support structure and the BN flake. Referring to FIG. 2H, in an exemplary embodiment, heating step 246 includes a step 270 of heating the support structure, the BN flake, and the polyimide at 110° C. for 10 minutes. Referring to FIG. 2I, in an exemplary embodiment, immersing step 250 includes a step 275 of immersing the BN flake adhered to the support structure in a methylpyrrolidone bath at 60° C.

Figure 2J:
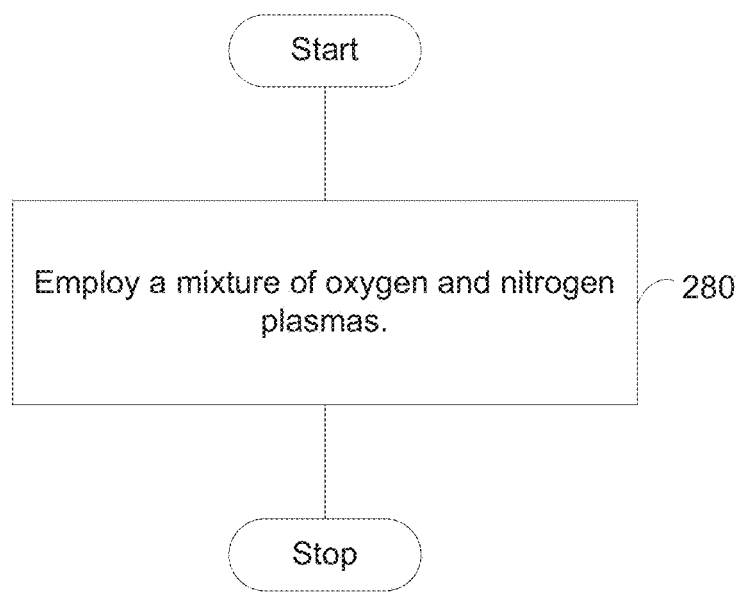
FIG. 2J is a flowchart in accordance with an exemplary embodiment of the present invention.
Figure 2K:
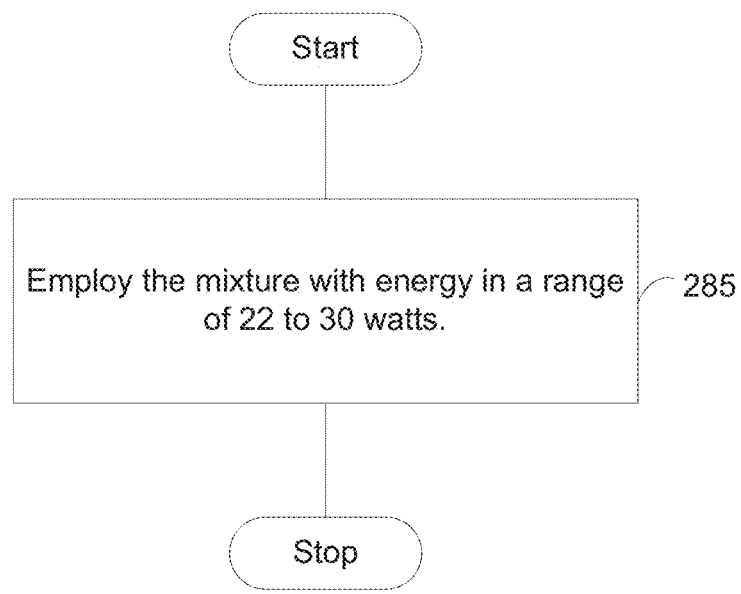
FIG. 2K is a flowchart in accordance with an exemplary embodiment of the present invention.

Referring to FIG. 2J, in an exemplary embodiment, performing step 212 includes a step 280 of employing a mixture of oxygen and nitrogen plasmas. Referring to FIG. 2K, in an exemplary embodiment, employing step 280 includes a step 285 of employing the mixture with energy in a range of 22 to 30 watts.

EXAMPLES

The invention will be described in greater detail by way of specific examples. The following examples are offered for illustrative purposes, and are intended neither to limit nor define the invention in any manner.

Example 1

Materials and Methods h-BN powder with grade PT 110 was purchased from Momentive Performance Materials and used in this experiment. This material was mechanically cleaved and transferred to the TEM grid as reported by D. Pacilé, J. C. Meyer, Ç. Ö. Girit, and A. Zettl, *Appl. Phys. Let.* 92, 133107 (2008). Boron nitride powder was peeled using adhesive tape and transferred to a silicon wafer with a 300 nm oxide layer.

Using optical microscopy, thin BN flakes were identified and transferred to the TEM grid. For this transfer, a Quantifoil gold TEM grid from SPI with a perforated carbon film and a hole size of 1.2 μm was placed on top of the BN flake, and a drop of isopropanol alcohol was placed on the grid and left to dry. While drying, the carbon film in the TEM grid was pulled down and was adhered to the BN flake as a result of surface tension. Then a drop of polyimide was placed on the TEM grid, and the sample was heated at 110° C. for 10 minutes. After heating, the polyimide was peeled off in one piece, enclosing the TEM grid and the now-adhered BN flake. The sample was then placed in a methylpyrrolidone bath for a few hours at 60° C. to dissolve the polyimide. The TEM grid was then transferred to isopropanol solution for a few minutes and then dried.

In order to further exfoliate the sheet to a one monolayer, the reactive ion etching technique was used. The exfoliation was performed on the TEM sample in a Plasma Etch model PE-200. A mixture of oxygen and nitrogen plasmas with the energy varying between 22 to 30 watts was used to further exfoliate the BN TEM samples down to a monolayer.

A TEAM 0.5, an ultrahigh-resolution aberration-corrected TEM that operates at 80 kV and is equipped with a monochromated electron source, was used. This microscope provides sub-angstrom resolution at 80 kV and is thus capable of imaging individual atoms in the h-BN lattice with minimal structural damage (See C. Kisielowski et al., *Microscopy and Microanalysis* 14, 469 (2008), J. C. Meyer, C. Kisielowski, R. Erni, M. D. Rossell, M. F. Crommie, and A. Zettl, *Nano Lett.* 8, 3582 (2008).).

Phase contrast transmission electron microscopy was carried out at 80 kV with the third order spherical aberration set to −18 μm. In order to maximize the number of equally resolved image points, the impact of third-order off-axial coma needed to be minimized. This resulted in finite value of the fifth order spherical aberration of about 7 mm (See H. Müller, S. Uhlemann, P. Hanel, and M. Haider, Physics Procedia 1, 167 (2008).). The TEAM 0.5 microscope was equipped with a source electron monochromator which was setup to obtain an energy spread of the electron beam of less than 0.2 eV (full width at half maximum (FWHM)). Considering the constant of chromatic aberration of 1.1 mm at 80 kV, the energy spread of the beam resulted in a focus spread of ~1.2 nm (rms) and an information limit of ~0.08 nm. Single lattice images were recorded at a defocus of about +10 nm. This imaging condition, optimized according to M. Lentzen, *Microscopy and Microanalysis* 14, 16 (2008), resulted in atoms appearing bright on a dark background. Through-focal series were recorded within a focal range of +12 nm to −12 nm employing a focal step of 0.6 nm.

Multi-slice simulations were carried out using MacTempas software employing a set of parameters in agreement with the experimental conditions. The complex electron wave at the exit-plane of the specimen was calculated in order to have a direct comparison with the exit-plane wave restored from through focal series. The figure of merit is the phase of the exit-plane wave.

Results

Images of h-BN

Figure 3:
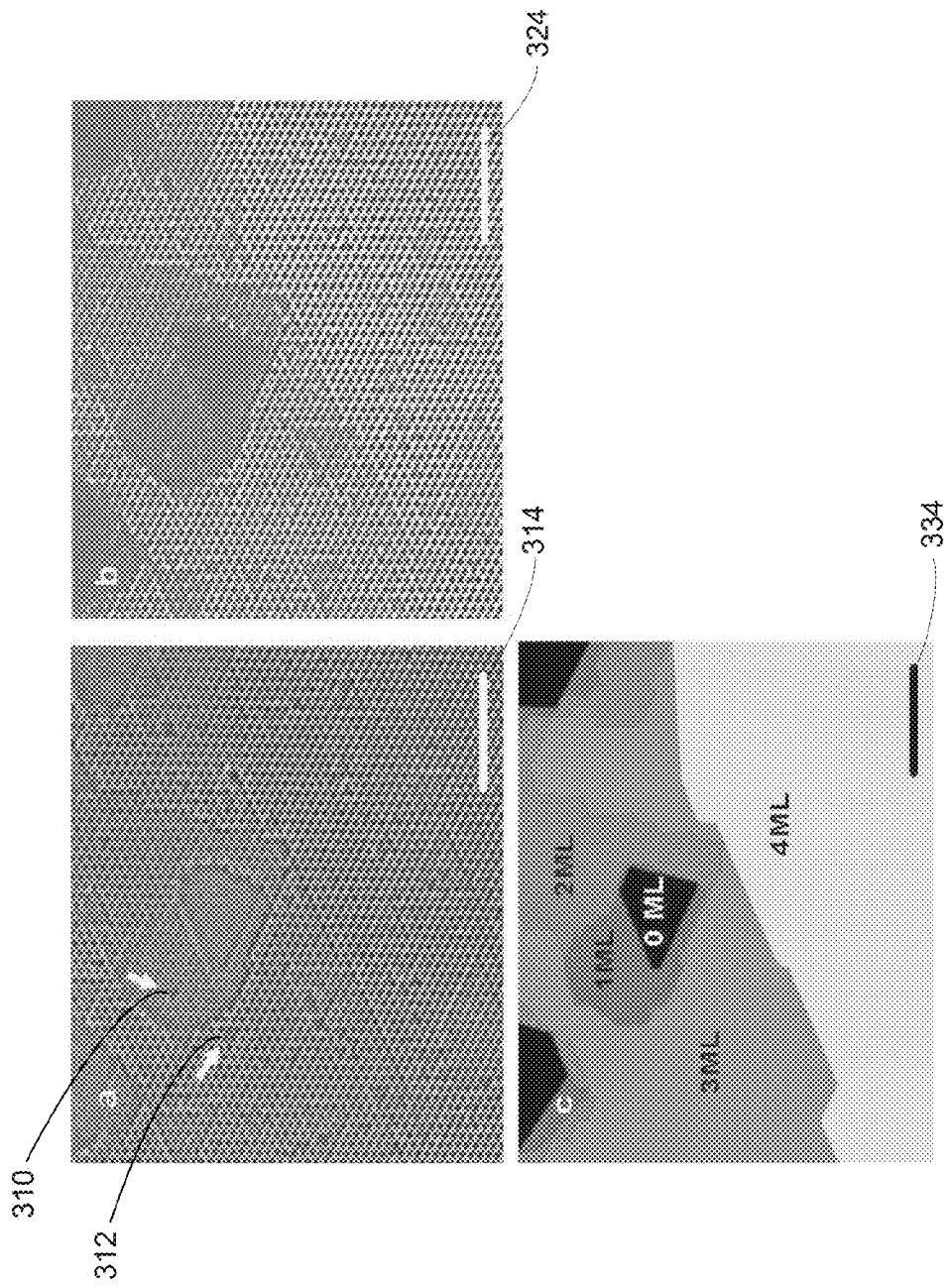

FIG. 3a shows a high resolution TEM image of a suspended thin h-BN specimen produced by the present invention. The scale bar 314 is 2 nm in FIG. 3a. Atomic structure of a one to four layer BN is shown in FIG. 3a. Striking features of the image are a small-scale periodicity, and larger-scale intensity variations, including intensity variations with triangular symmetry. The small-scale periodic bright spots correspond to individual B or N atoms (or atomic columns) in the expected honeycomb arrangement, with a nearest neighbor in-plane B—N distance of 2.5 Å, in agreement with the known crystal structure of h-BN (See B. G. Demczyk, J. Cumings, A. Zettl, and R. O. Ritchie, *Appl. Phys. Lett.* 78, 2772 (2000).). The larger-scale intensity variations in FIG. 3a correspond to differences in layer number across the specimen, including minor and major regions of missing atoms. Every atom in every layer in the specimen within the TEM field of view was identified.

Figure 1:
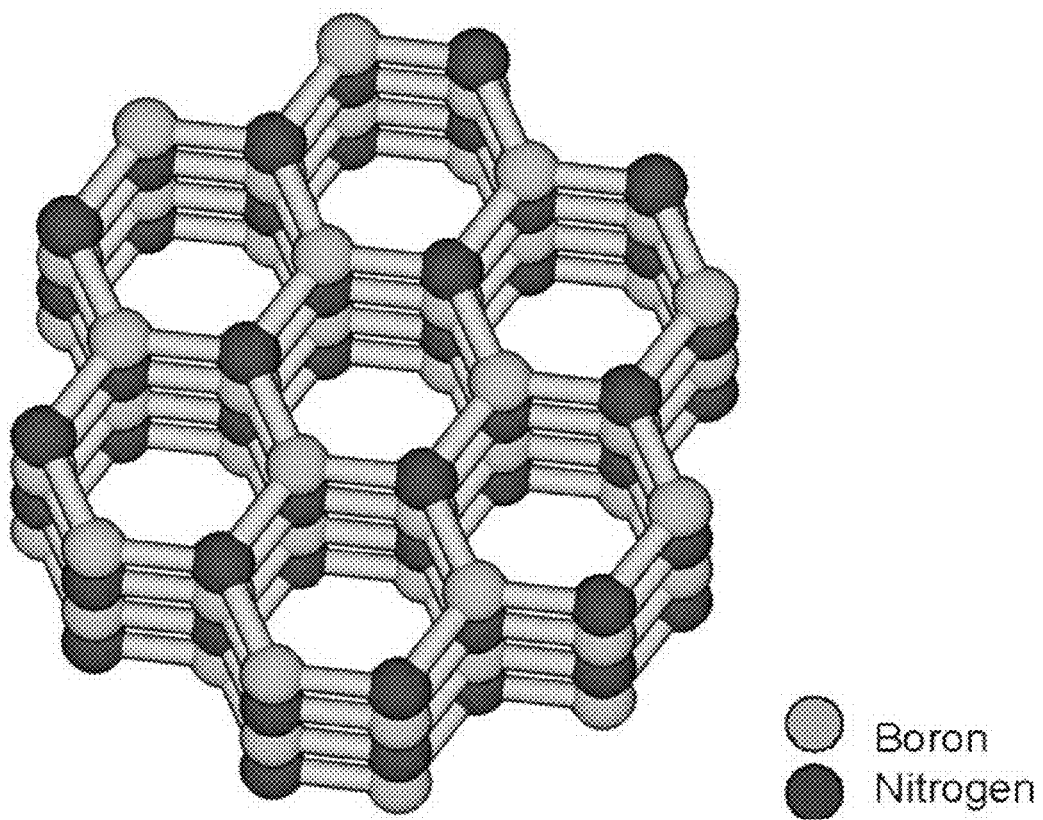
FIG. 1 illustrates a boron nitride (BN) hexagonal lattice.

In order to identify the number of atomic layers in a given region of the suspended specimen, a reconstructed phase image of one to four layer BN previously shown in FIG. 3a was obtained, as shown in FIG. 3b. The scale bar 324 is 2 nm in FIG. 3b. From FIG. 3b, a general layer-number or thickness map for the entire specimen within the TEM field of view was extracted, as shown in FIG. 3c. Knowledge that for multilayers (i.e., regions with layer number n>1), the atoms in normal projection for AAA stacking are located directly on top of one another (See FIG. 1.) aided in Example 1. Simulations showed that, under the assumption that the specimen is thinner than the focal spread, the intensity at an atomic position increased approximately linearly with each additional layer (B and N have very similar scattering power.).

Thus, from the intensity profiles in FIG. 3b, the layer number thickness map of FIG. 3c was obtained, where each color represents the general extent of a given total thickness, from one monolayer (1 ML) thick up to four monolayers thick (4 ML). FIG. 3c shows the number of layers in boron nitride imaged. The scale bar 334 is also 2 nm in FIG. 3c. The three black regions, labeled 0 ML, correspond to holes in the membrane (i.e., vacuum). FIG. 3c shows examples of where the sample thickness increases in unity monolayer steps; however, there are also locations where an edge step corresponds to an abrupt jump by two or more monolayers. Such distinctions proved to be particularly important in the atom identification analysis described below.

Sum of Twenty Unit Cells of BN

Figure 4:
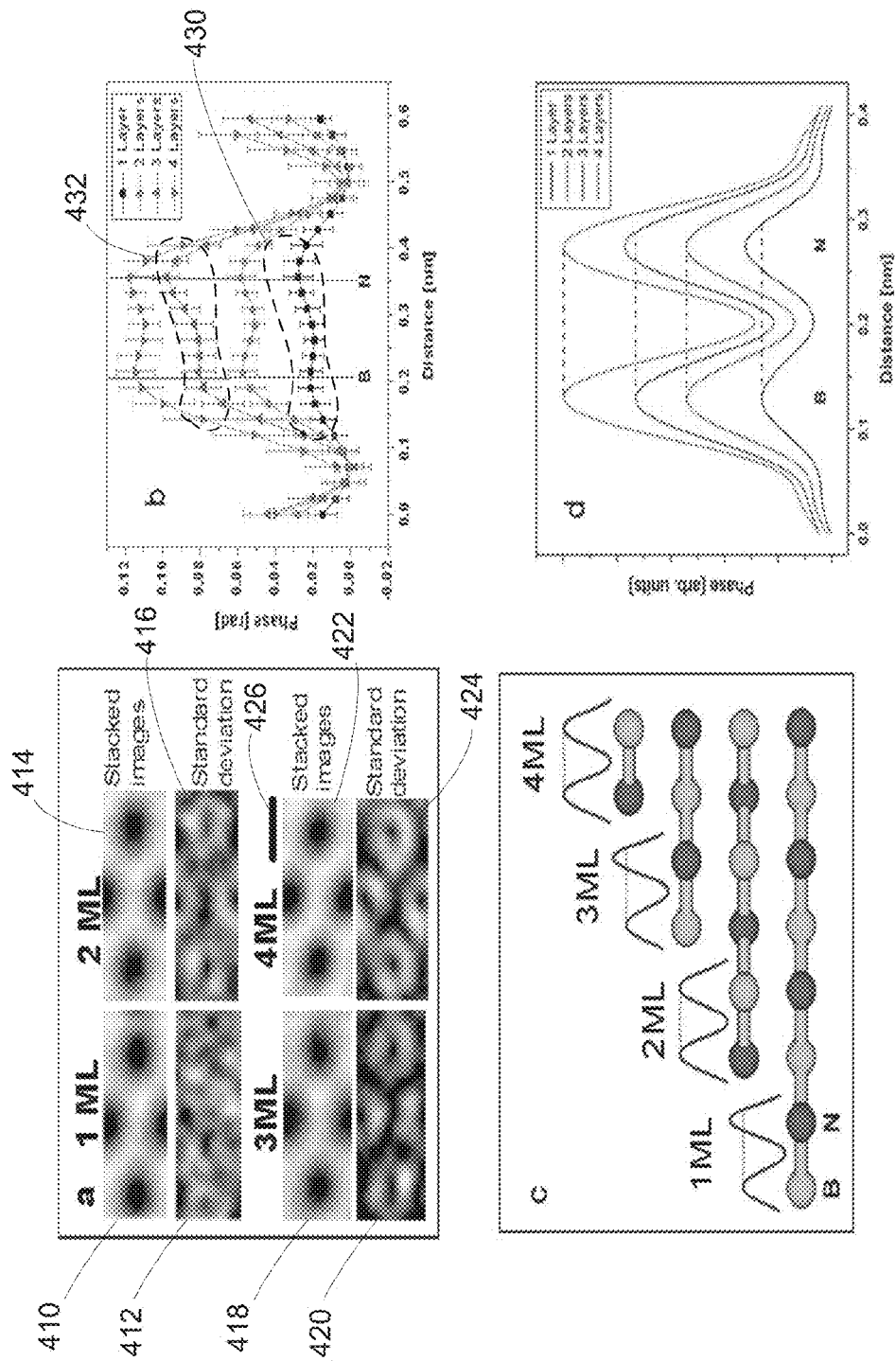

In order to improve signal to noise, 20 images of the BN unit cell randomly selected from a defect-free monolayer region of the h-BN specimen (See FIG. 3b and FIG. 3c) were summed, as shown in FIG. 4a. The scale bar 426 in FIG. 4a shows 1.5 Å. The normalized unit cell image 410 and its standard deviation 412 are shown in FIG. 4a. Similar results (414, 416, 418, 420, 422, 424, respectively) were obtained for 2-, 3-, and 4-layer regions, as shown in FIG. 4a. The donut-shaped rings around the atom positions in the standard deviation plots reflect thermal and electron-beam induced bond vibrations in the BN lattice.

FIG. 4b presents line profiles through the unit cell intensity data of FIG. 4a, for n=1 through n=4. The two peaks in each line scan represent adjacent columns of atoms linking the h-BN layers. For the monolayer (n=1), a slight but distinct asymmetry 430 in the peak heights is observed. This asymmetry largely disappears for n=2 and n=4, but reappears for n=3, as asymmetry 432. Thus, asymmetry was found only for columns of atoms with an odd number of atoms (i.e., layers).

FIG. 4c shows schematically an edge-on profile view of the atomic structure of successive BN monolayers built up stepwise. With imaging electrons impinging from above and probing columns of atoms, only columns within an odd number of layers may have differences in the total number of atoms of one species. Columns within an even number of layers have n/2 boron atoms and n/2 nitrogen atoms.

The scattering of electron beam for the parameters appropriate to the microscope and sample was simulated, with results shown in FIG. 4d. Within experimentally relevant limits, it was found from these simulations that for n=1 to n=4, the intensity for a column of atoms depends only on the total number of B atoms and the total number of N atoms, not on the order of such atoms in the column. The simulations show a clear intensity asymmetry for adjacent columns in the odd-layer-number regions, n=1 and n=3, and no discernable asymmetry for adjacent columns in even-layer-number regions, n=2 and n=4. Nitrogen yields the stronger intensity in this representation. Hence, for the experimental data of FIG. 4b, the smaller peak in the monolayer line scan was identified as belonging to B and the larger peak as belonging to N. Once B and N were identified within a unit cell in the monolayer (or B or N as the majority atom, i.e., top and bottom atom, in any column in an odd-layer-number region), all other atoms in the h-BN crystal specimen were uniquely chemically identified, as can be readily inferred from FIG. 4c.

Effect of TEM Instrumentation Errors

In cases where TEM instrumentation errors exist, it has been found, both experimentally and through detailed simulations, that spurious intensity line scan asymmetries can appear between adjacent atomic columns, uncorrelated to the actual chemical make-up of the atom (See Example 2.). Indeed, with such problems present, the apparent asymmetries often increased with increasing layer number (including even layer numbers), rather than falling to zero for even number layers as shown correctly in FIG. 4b and FIG. 4d.

Defects in h-BN

The identification of the sub-lattices in h-BN (i.e., the correct identification of all B and all N atoms within a layer in the specimen) set the stage for proper interpretation of defect structure. FIG. 3a shows a host of unusual crystal imperfections. The plethora of defects observed was most likely not a good representation of the original "as-grown" h-BN specimen, but was a consequence of the rather severe reactive ion etching process used to thin the sample. In addition, it was observed that the electron beam itself created vacancies through knock-on damage, general sample agitation, and atomic diffusion. The two arrows in FIG. 3a point to defects 310 and 312 resulting from missing atoms within a layer.

Figure 5:
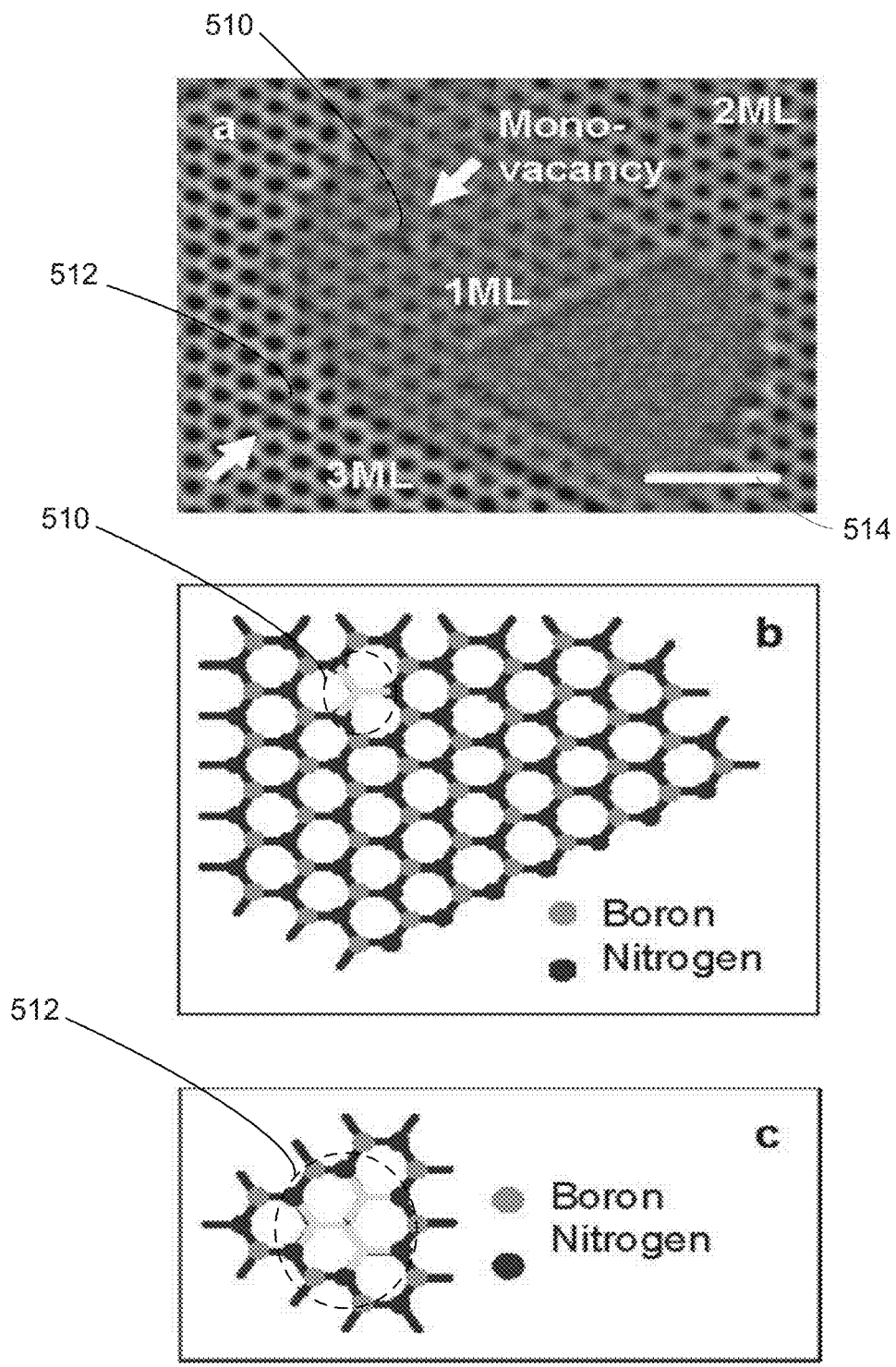

FIG. 5a shows the same defects in a magnified, reconstructed phase image of the lattice structure in a monolayer of BN produced by the present invention. The scale bar 514 is 1 nm in FIG. 5a. The upper defect 510 resides in an n=1, monolayer region of the sample, while the lower defect 512 resides in an n=3 region.

A model for the atom positions in the monolayer was created by repeating the previously identified BN unit cell for this layer, as shown in FIG. 5b. FIG. 5b shows the model positions of boron and nitrogen atoms in the monolayer region. This model shows the mono-vacancy 510 to form as a result of a boron atom missing and the edges to be nitrogen terminating zigzag edges. According to FIG. 5b, mono-vacancy 510 is a missing B atom. It was found that mono-vacancies throughout the sample appeared to be predominantly associated with missing boron atoms. Preferential formation of boron mono-vacancies in the sample under the 80 keV TEM imaging electron beam was expected, since the energy threshold for the knock-on damage of boron and nitrogen atoms in h-BN is 74 eV and 84 KeV respectively, assuming an otherwise perfect monolayer crystal (See A. Zobelli, A. Gloter, C. P. Ewels, G. Seifert, and C. Colliex, *Phys. Rev. B* 75, 245402 (2007).)

Besides boron mono-vacancies just described, larger triangle-shaped vacancies, which result from clusters of multiple missing atoms, were observed. Numerous such defects are observable in FIG. 2a and FIG. 5a, with different sizes and orientations. The lower triangular defect identified with an arrow in FIG. 3a, defect 312, (and again in FIG. 5a as defect 512) which resides in a three-layer region was considered. Since all atoms in this n=3 region had been previously identified by the methods presented above, it was found that this large vacancy resulted from three missing boron atoms and one nitrogen atom, most likely grouped together on either the top or the bottom layer (momentum transfer from electron knock-on effects would suggest the missing atoms are from the bottom layer).

FIG. 5c shows a model of defect 512 and indicates that the "internal" edges of vacancy 412 maintain a nitrogen-terminated zigzag configuration. The boron and nitrogen atom positions are shown in large vacancy, defect 512.

Large-Scale Layer Terminations

Figure 6:
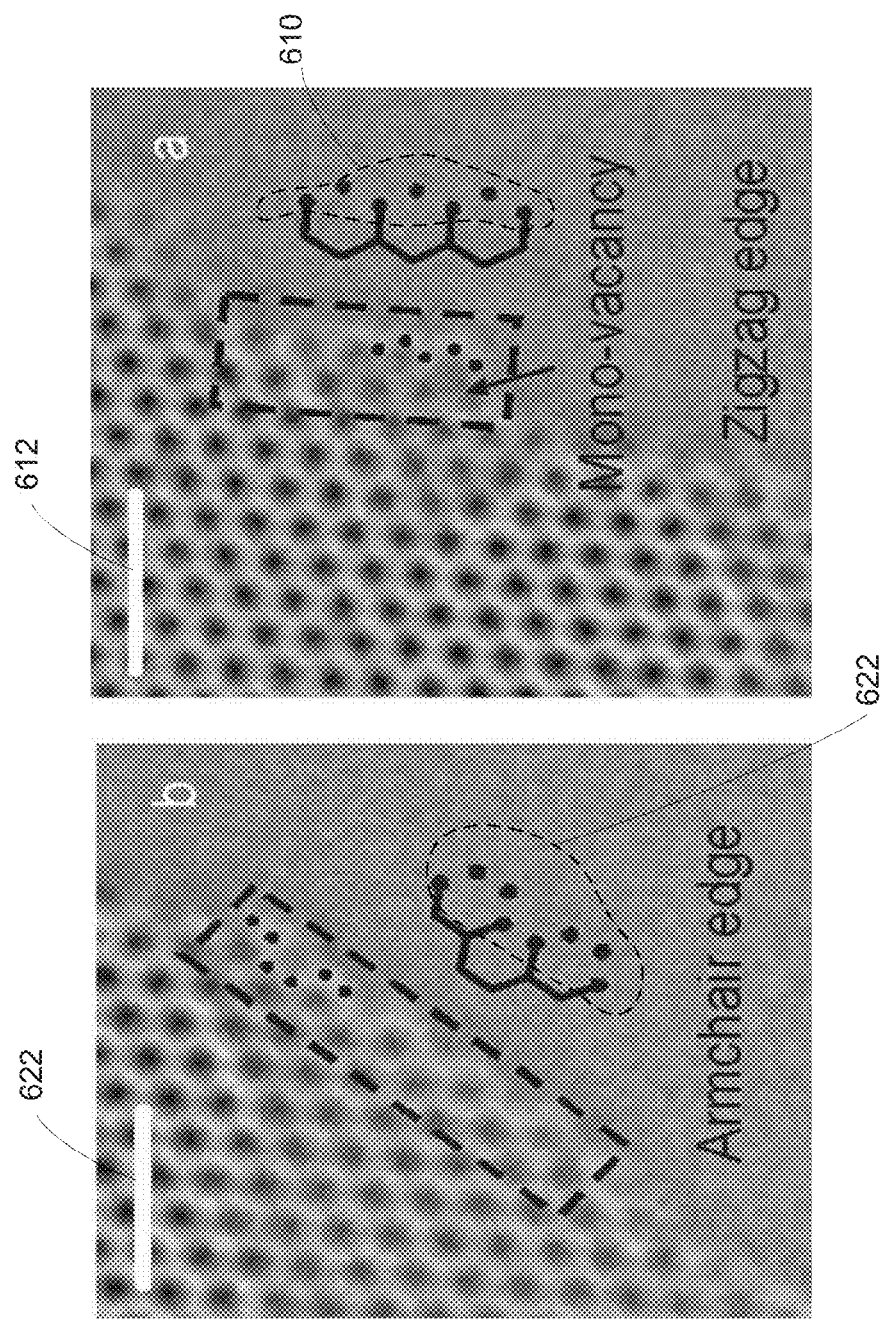
FIG. 6a is a HRTEM image of BN sheet at the edge, showing zigzag edges.
FIG. 6b is a HRTEM image of BN sheet at the edge, showing armchair edges.

The edge configurations for large-scale layer terminations, including vacuum holes in the monolayer and atomic step edges, were examined. As just discussed, nitrogen-terminated zig-zag edges are stable for triangle-like defects. Besides defect edges, nitrogen-terminated zig-zag edges 610 were also observed by the holes in monolayer and multi-layer regions, as shown in FIG. 6a, a HRTEM image of BN sheet at the edge. The scale bar 612 is 1 nm in FIG. 5a. Alternating B—N armchair edges 620 also exist in BN, as shown in FIG. 6b, also a HRTEM image of BN sheet at the edge, albeit with far lesser frequency than nitrogen-terminated zig-zag edges 610. The scale bar 622 is also 1 nm in FIG. 6b.

It was observed that zigzag edges 610 in BN were more stable under the TEM electron beam. A recent study on the edge dynamics in a single layer graphene has shown that the single- or double-bonded carbon atoms at the edges are less stable under the electron beam and therefore have a lower knock-on energy threshold (See Ç. Ö. Girit, J. C. Meyer, R. Erni, M. D. Rossell, C. Kisielowski, L Yang, C. H. Park, M. F. Crommie, M. L. Cohen, S. G. Louie, and A. Zettl., *Science* 323, 1705 (2009), R. F. Egerton, F. Wang, and P. A. Crozier, *Microscopy and Microanalysis* 12, 65 (2006), B. W. Smith, and D. E. Luzzi, *J. Appl. Phys.* 90, 3509 (2001), V. H. Crespi, N. G. Chopra, M. L. Cohen, A. Zettl, and S. G. Louie, *Phys. Rev. B* 54, 5927 (1996).) Similar to graphene, it is believed that the higher stability of the nitrogen-terminated zigzag edges 610 in h-BN are most likely related to the difference in knock-on energy threshold for B versus N (even at the edge), together with an intrinsic preference for zig-zag configurations generally in planar $sp^2$-bonded sheet materials.

h-BN in Comparison to Graphene and Graphite

The honeycomb in-plane structure and anisotropic bonding between layers in h-BN allows comparison to graphene and graphite, while the presence of two atomic sublattices and consequent ionic character of the bonding in h-BN dictates different interlayer stacking and markedly different defect structure from the carbon analogs. The successful distinction of boron from nitrogen within an h-BN monolayer, and the identification of the B and N sublattices throughout the entire crystal is an important advance for 2-D crystal investigations. Although graphene and h-BN have similar atomic structures, no evidence for the formation of Stone-Wales type defects in BN sheets was found, presumably due to an unfavorably high formation energy of B—B and N—N bonds in the BN lattice (a similar argument applies for BN nanotubes (See X. Blasé, A. De Vita, J. C. Charlier, and R. Car, *Phys. Rev. Lett.* 80, 1666-1669 (1998), A. Loiseau, F. Willaime, N. Demoncy, G. Hug, and H. Pascard, *Phys. Rev. Lett.* 76, 4737, (1996).).

Atomic Vibrations

Atomic vibrations around mono vacancies, edges, and within the lattice in h-BN layers, was explored. The standard deviation images in FIG. 4a show the extent of such motion, and the white rings surrounding the atom positions quantify these excursions. Such vibrations were more significant in a monolayer since the atoms are only confined in a two-dimensional space, not by extra bonds at the top and the bottom. In the three and four layer areas, in contrast, the atoms experienced ionic forces applied to them from the top and the bottom layers. Bond relaxations and distortions also occurred in the vicinity of mono-vacancies and edges. TEM observations showed that the bond vibrations can lead to the distortion of the vacancy which can further break its three-fold symmetry. Such distortions can be related to hybridization of $sp^2$ orbitals of the edge atoms at the vicinity of the vacancy and the Jahn-Teller effect (See S. Azevedo, J. R. Kaschny, C. M. C. De Castilho, and F. D. Mota, *The European Physical Journal B* 67, 507 (2009), R. F. Liu, and C. Cheng, *Phys. Rev. B* 76, 014405 (2007).). Further studies could be done for bond distortions induced by adsorption of adatoms, such as hydrogen, to sheet atoms generally, and to the dangling bonds at the edge of the vacancy in particular.

Example 2

The effect of mis-Tilt and coma on lattice images of graphene was also studied. Multi-slice simulations to understand the effect of mis-tilt and $2^{nd}$ order axial coma (B2) on HRTEM images of grapheme were performed. Since boron nitride consisting of an odd number of layers is supposed to show asymmetrical modulations due to its composition, a monolayer of graphene was considered.

Figure 7A:
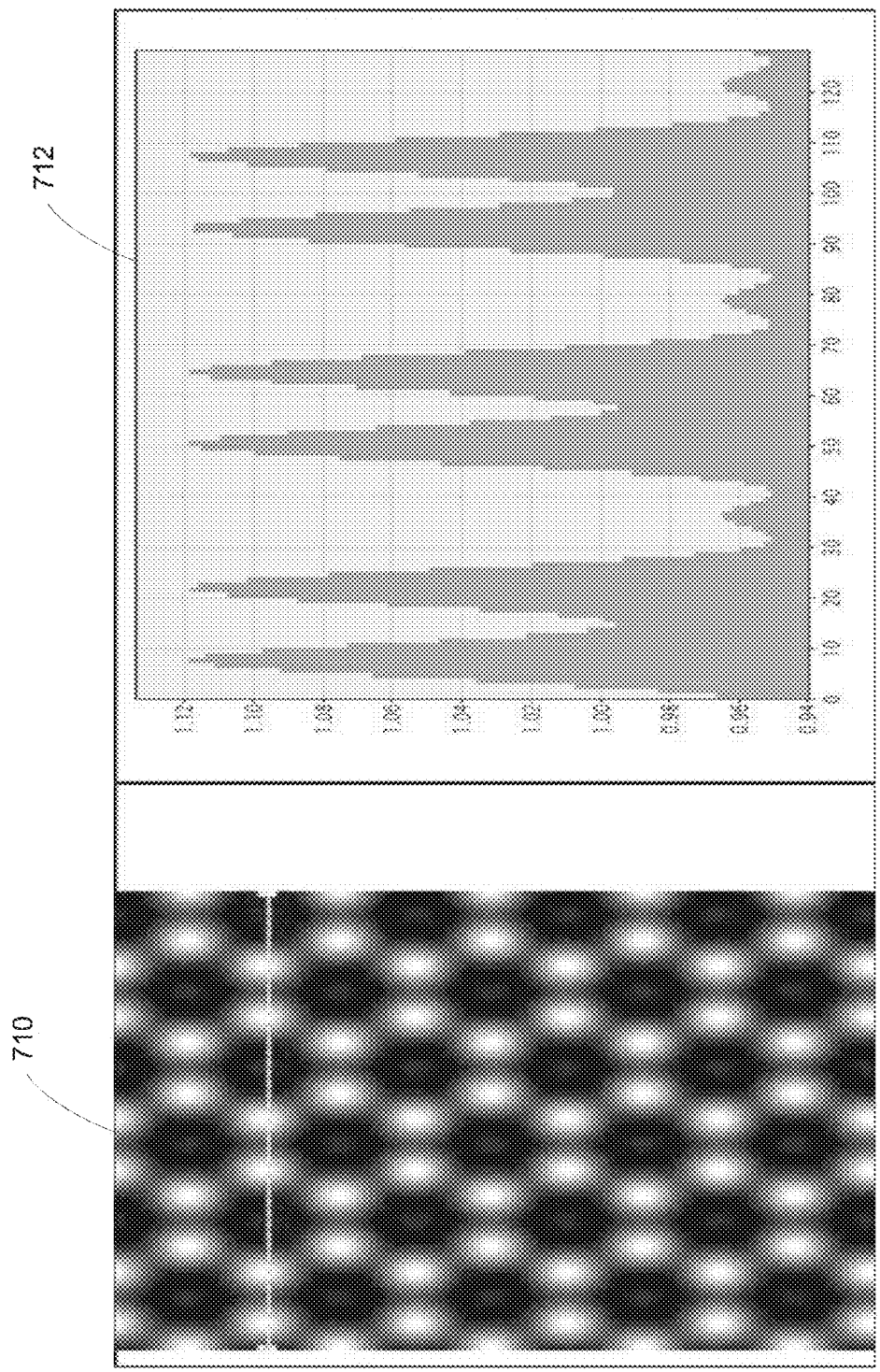
FIG. 7a depicts graphene under optimized imaging conditions.

Under optimized imaging conditions, all carbon atoms on the honeycomb lattice of graphene were expected to show the same intensity in HRTEM images. This is shown in FIG. 7a. FIG. 7a shows a simulated image of graphene 710 and its intensity line profile 712 when there is no mis-tilt and coma present in the image at 80 kV, C1=11.5 nm (defocus), C3=−20 μm ($3^{rd}$ order spherical aberration), and C5=5 mm ($5^{th}$ order spherical aberration)). The imaging parameters were set according to the BN experiment described in Example 1. As expected, all imaged carbon atoms showed the same intensity, as shown in line profile 712.

Figure 7B:
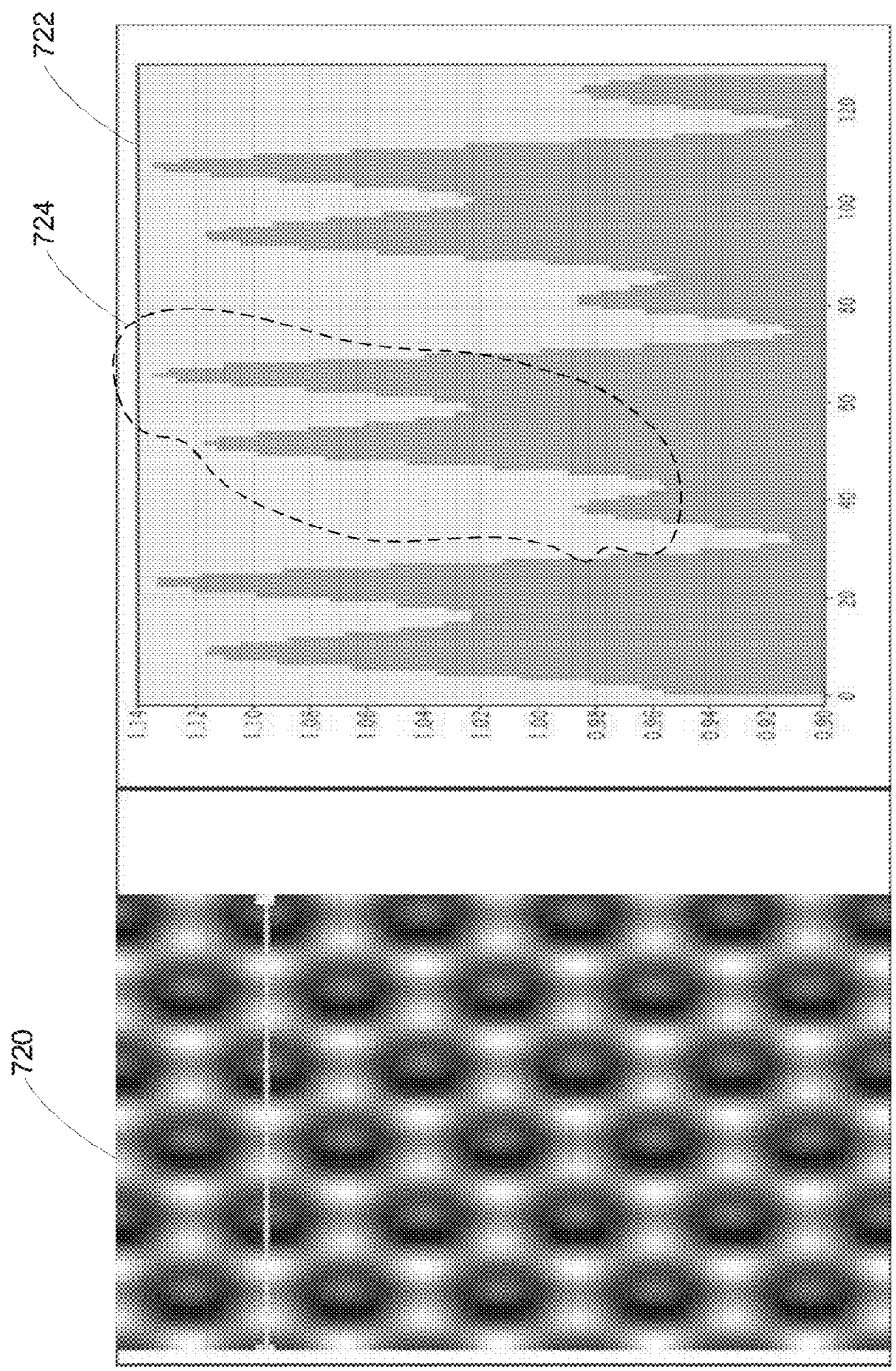
FIG. 7b depicts graphene imaged with 250 nm coma (B2).

FIG. 7b shows the effect of 250 nm coma on the imaging process, at 80 kV, C1=10.5 nm, C3=−20 μm, C5=5 mm. According to FIG. 7b, asymmetric modulations are observed in adjacent atomic columns in image 620. This asymmetric modulation 724 can also be seen in line profile 722 in FIG. 7b.

Figure 7C:
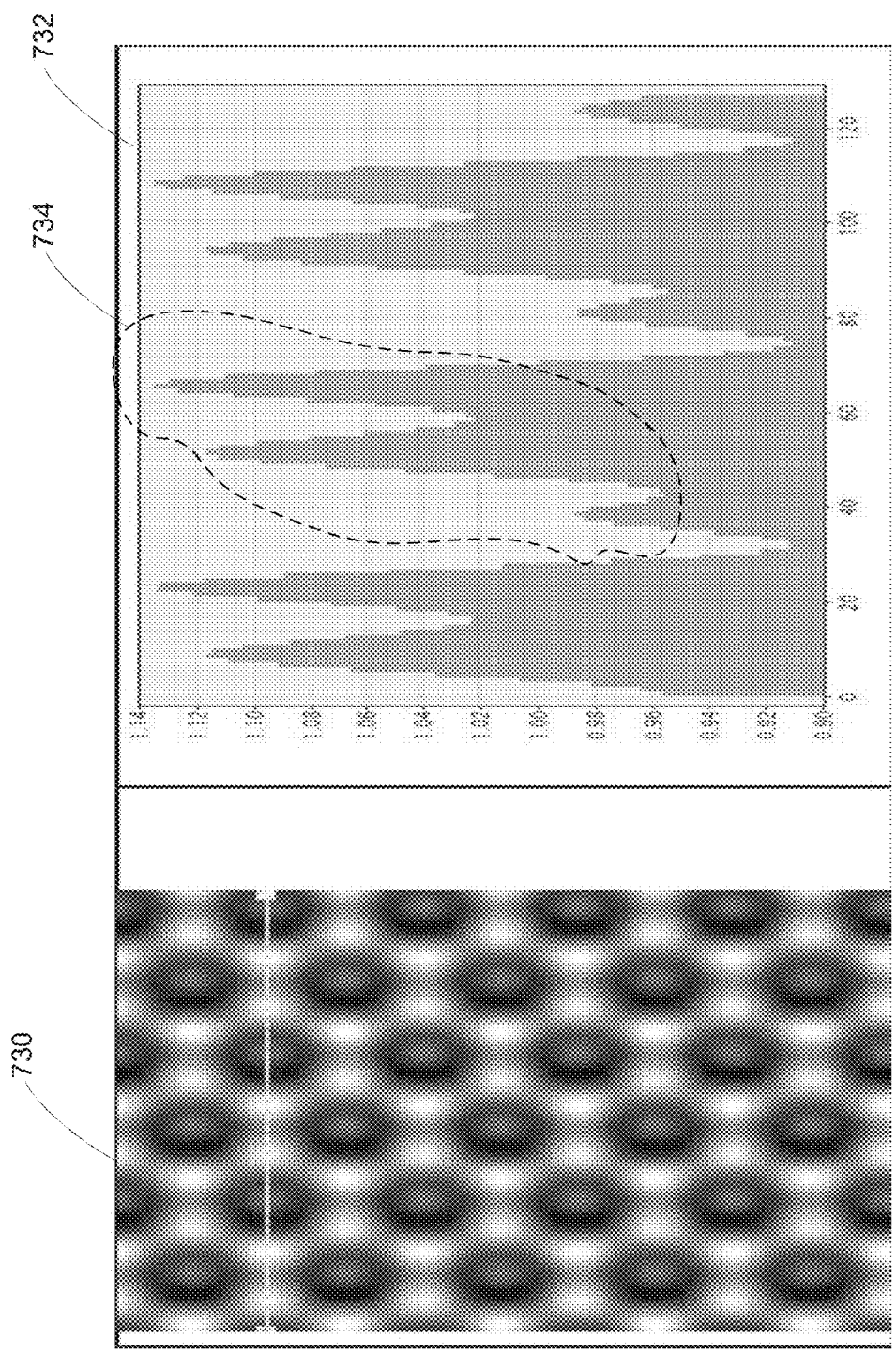
FIG. 7c depicts graphene imaged with 5 degrees mis-tilt.

FIG. 7c presents the effect of 5° mis-tilt in grapheme, at 80 kV, C1=9.5 nm, C3=−20 μm, and C5=5 mm. According to FIG. 7c, the image 730 and the line profile 732 both show asymmetric modulations 734 arising from the mis-tilt.

Hence, the microscope conditions can influence the image intensity. The presence of specimen mis-tilt and/or coma can induce a periodic intensity modulation (such as asymmetric modulations 724 and 734) which looks like a fake chemical contrast. The same effect is expected for any kind of anisotropic geometrical aberrations. As mentioned above, grapheme was expected to show the same intensity in every imaged carbon atom. However, coma and specimen mis-tilt led to an observed modulation of the image intensity which looked like a chemical contrast.

Examples Conclusion

BN which should show a chemical contrast is vulnerable to the same effect. Hence, a similar modulation in images of BN can be induced by a slight mis-tilt or coma. Therefore, to identify chemical nature of the atomic columns in BN, additional steps should be considered for imaging BN. A crucial test to show that the contrast modulation in a lattice image of BN reflects the real chemical nature of the atomic columns (or atoms), is to see this contrast vanish for BN samples with even number of layers.

Asymmetry was observed to disappear in even-layer number regions of h-BN. Particular care had to be taken to eliminate residual aberrations, slight mis-tilt, and coma-astigmatism, all of which could significantly distort contrast asymmetry in h-BN and compromise atom identification. Such distortions have also been observed and noted by Meyer et al.

CONCLUSION

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of fabricating single layer hexagonal boron nitride comprising:
   (a) providing multilayer boron nitride suspended across a gap of a support structure; and
   (b) performing a reactive ion etch on the multilayer boron nitride to produce the single layer hexagonal boron nitride suspended across the gap of the support structure.

2. The method of claim 1 wherein operation (b) comprises using a mixture of oxygen and nitrogen plasmas.

3. The method of claim 2 wherein the mixture has an energy in a range of 22 watts to 30 watts.

4. A method of fabricating single layer hexagonal boron nitride (h-BN) comprising:
   (a) suspending multilayer boron nitride across a gap of a support structure; and
   (b) performing a reactive ion etch on the multilayer boron nitride to produce the single layer hexagonal boron nitride suspended across the gap of the support structure.

5. The method of claim 4 wherein operation (a) comprises: peeling boron nitride (BN) powder; moving the peeled BN powder to a wafer; identifying a BN flake; and transferring the BN flake to the support structure.

6. The method of claim 5 wherein the wafer is a silicon wafer.

7. The method of claim 5 wherein the identifying comprises using an optical microscope.

8. The method of claim 5 wherein the transferring comprises:
   placing the support structure on top of the BN flake;
   depositing alcohol on the support structure and the BN flake;
   allowing the alcohol to dry;
   putting polyimide on the support structure and the BN flake;
   heating the support structure, the BN flake, and polyimide;
   peeling the polyimide from the support structure and the BN flake, resulting in the BN flake being adhered to the support structure;
   immersing the BN flake adhered to the support structure in a methylpyrrolidone bath to dissolve the polyimide;
   relocating the BN flake adhered to the support structure to an isopropanol solution; and
   letting the BN flake adhered to the support structure dry.

9. The method of claim 8 wherein the support structure comprises a transmission electron microscope (TEM) grid.

10. The method of claim 8 wherein the alcohol comprises isopropanol alcohol.

11. The method of claim 8 wherein the heating comprises heating the support structure, the BN flake, and the polyimide at 110° C. for 10 minutes.

12. The method of claim 8 wherein the methylpyrrolidone bath is at 60° C.

13. The method of claim 4 wherein operation (b) comprises using a mixture of oxygen and nitrogen plasmas.

14. The method of claim 13 wherein the mixture has an energy in a range of 22 watts to 30 watts.

* * * * *